United States Patent Office 3,748,156
Patented July 24, 1973

3,748,156
REFRACTORY LAMINATE BASED ON POSITIVE SOLS AND POLYFUNCTIONAL ORGANIC AND INORGANIC ACIDS AND SALTS
Earl P. Moore, Jr., Wilmington, Del., assignor to E. I. du Pont de Nemours and Company, Wilmington, Del.
No Drawing. Continuation-in-part of abandoned application Ser. No. 49,907, June 25, 1970. This application June 1, 1971, Ser. No. 148,966
Int. Cl. C04b 35/14
U.S. Cl. 106—38.3          12 Claims

ABSTRACT OF THE DISCLOSURE

A rapid process for forming a refractory laminate on the surface of a support structure which comprises dipping the structure into a bath comprising a sol of positively charged colloidal particles of an inorganic substance to form a coating on the surface, contacting the coated surface with a solution or dispersion of a polyfunctional organic or inorganic acid or salt to firmly set the coating, and removing excess setting agent solution or dispersion from the coated surface. This procedure is repeated until a laminate of the desired thickness is built up on the surface. This technique makes it possible to successively apply and set coatings in very short times without intermediate drying and without sloughing of coats. The process is particularly suited for making expendable refractory shell molds for precision investment casting of metals by the so-called "lost-wax" technique.

CROSS-REFERENCE TO RELATED APPLICATIONS

This application is a continuation-in-part of my co-pending application Ser. No. 49,907 filed June 25, 1970, now abandoned.

BACKGROUND OF THE INVENTION

This invention relates to a process for forming refractory laminates. The process is useful for a variety of purposes but it was developed for and is particularly suited to the manufacture of expendable refractory shell molds for precision investment casting of metals by the "lost-wax" or disposable pattern technique.

Refractory shell molds for precision investment casting are usually prepared by dipping a disposable pattern, which is a replica of the part to be cast, into a refractory slurry consisting of a suspension of fine refractory grain in a bonding liquid. The disposable pattern is usually wax or plastic and is solvent cleaned prior to dipping into the slurry. Other disposable materials such as low-melting tin-bismuth alloy and frozen mercury are sometimes employed for the pattern. The binder is generally capable of hardening during drying at room temperature. After dipping, the excess slurry is drained from the coated pattern and while the coating is still wet it is stuccoed with coarser refractory particles. The stuccoing is carried out by dipping the coated pattern into a fluidized bed of the refractory particles or by sprinkling the particles onto the pattern. The process of dipping and stuccoing is repeated until a refractory shell having sufficient thickness to resist stresses incurred in subsequent casting operations is built up around the pattern. The usual thickness of the shell is from ⅛ to ½ inch, although thinner or thicker shell may be produced. The completed pattern is usually dried under ambient conditions for 24 hours. The disposable pattern is then usually removed from the ceramic shell mold by flash dewaxing furnaces, steam autoclaves, or boiling solvent baths. The refractory shell mold is then fired at 1700–1900° F. to prepare it for metal casting.

In this conventional manner of making refractory shell molds the period of drying between coating applications may vary from 30 minutes to 4 hours depending on temperature, humidity, air flow and complexity of the pattern. This greatly increases the time and cost involved in making the molds. Drying is particularly slow in recessed areas or "blind cores" (hollow openings, closed at one end). These refractory molds may dry only after many hours, since much of their surface area is not suitably disposed to drying by the atmosphere. Drying is necessary to harden the slurry coatings and to insure that subsequent coats will adhere to previous ones without sloughing away.

Another shortcoming of the conventional method of making shell molds is that when the slurry is dried microfractures often occur on hardening. When the next slurry coating is applied the binder in the slurry may flow through the stucco and either dissolve the slurry coating in part or cause it to flake.

Because of these shortcomings of the conventional mold forming processes, efforts have been made to develop chemical methods for rapid setting of the binder coatings, in order to eliminate the requirement of drying between dips and reduce the time interval between dips to a few minutes. One approach has been to use a gaseous reactant in order to set the binder. U.S. Pat. 2,829,060 discloses the use of carbon dioxide to set sodium silicate-bonded shells containing ammonia. U.S. Pat. 3,455,368 discloses the use of ammonia gas to set hydrolyzed ethyl silicate or acidified aqueous colloidal silica-bonded shells. U.S. Patent 3,396,775 discloses the use of volatile organic bases in order to set shells bonded with hydrolyzed ethyl silicates.

Volatile solvents and gaseous ammonia present ventilation problems to the foundry. These problems have contributed to the slow acceptance of the present fast-setting systems.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds," British Investment Casters' Technical Association, 9th Annual Conference. However, systems based on gelling due to pH changes have not found wide spread acceptance because gelation is slow and the resulting wet gels are weak. This gives rise to sloughing-off of the early coats during subsequent dipping.

A third rapid setting approach in the art employs sodium silicate as the binder and mono-ammonium phosphate and magnesium oxide are in the stucco as a gelling agent. This is described in an article by Dootz, Craig, and Peyton, "Simplification of the Chrome-Cobalt Partial Denture Casting Procedure," J. Prosthetic Dentistry, vol. 17, No. 5, pages 464–471, May 1967.

A fourth approach employs an ethyl silicate dip coat which is set with aqueous colloidal silica containing ammonia. This is disclosed in an article by Shepard, "Adaptation of the Ceramic Shell Mould to Meet Mass Production Requirements," British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

SUMMARY OF THE INVENTION

This invention is a rapid process for forming a refractory laminate on the surface of a support structure which comprises:

(a) dipping the structure in a bath comprising a sol of positively charged colloidal particles of an inorganic substance to form a coating on the surface,
(b) contacting the coated surface with a solution or dispersion of a polyfunctional organic or inorganic acid or salt setting agent to firmly set the coating,
(c) removing excess setting agent from the coated surface, and
(d) repeating steps (a) through (c) in sequence as required to build a refractory laminate of the desired thickness.

In a preferred embodiment the bath of step (a) comprises a slurry of particulate refractory ceramic or metal in a sol of positively charged colloidal particles composed of a silica core coated with a polyvalent metal-oxygen compound. In a particularly preferred embodiment the positively charged particles are composed of colloidal silica coated with alumina.

As mentioned previously, the process of this invention is particularly suited to the manufacture of expendable refractory shell molds for precision investment casting of metals. In this use of the invention a disposable pattern of the metal casting is dipped into a bath comprising a sol of positively charged colloidal particles to form a coating on the pattern. Thereafter the coated pattern is contacted with a solution or dispersion of a polyfunctional organic or inorganic acid or salt setting agent to firmly set the coating, and excess setting agent is drained or rinsed from the coated pattern. This procedure is then repeated in sequence as required to build a refractory shell mold of the desired thickness. Preferably the dip bath used in step (a) comprises a slurry of refractory grain in a sol of positively charged colloidal particles composed of a silica core coated with a polyvalent metal-oxygen compound. In the most preferred embodiment these positively charged colloidal particles are alumina coated silica particles. Also in a preferred embodiment the coated pattern is stuccoed with a refractory grain between steps (a) and (b). In a particularly preferred embodiment two slurries of refractory grain in positive sol are used. The first slurry contains relatively fine refractory grain and is used for the first or prime coat. The second contains relatively coarse refractory grain and is used for subsequent coats (back-up or follow-up coats).

This invention also includes refractory laminates and refractory laminate articles, such as refractory shell molds, made by the above-described process. The refractory laminates comprise superposed layers of a gel of positively charged colloidal particles of an inorganic substance containing a polyfunctional organic or inorganic acid or salt setting agent. Preferably the positively charged colloidal particles are composed of a silica core coated with a polyvalent metal-oxygen compound such as alumina. The gel layers preferably also contain refractory grain. The gel layers can also be separated by intermediate layers of refractory grain. In the refractory shell molds it is preferred that the gel layers be separated by intermediate layers of stucco refractory grain.

For the manufacture of refractory shell molds the process of this invention offers a number of advantages as compared to the above-described prior art processes. Most importantly it is a rapid process because it is not necessary to dry between coats. As soon as one coat has been stuccoed the coated pattern can be dipped into the solution or dipersion of acid or salt. When this is done an essentially instantaneous coagulation of the coating occurs, due to the interaction of the positively-charged colloid and the negatively charged anions of the setting agent. It is believed that the setting agents, being polyanionic, produce a cross-linking action which results in aggregation of the colloidal particles. After setting, the setting agent solution must be thoroughly drained or rinsed from the pattern in order to avoid contamination of the slurry during the following coating step. However, even allowing for removal of the excess setting agent solution, the process is rapid. For example, a mold of about ⅜″ thick can be formed within 15–30 minutes.

DESCRIPTION OF THE INVENTION

The invention will now be described in detail with particular reference to its use in forming expendable refractory shell molds for precision investment casting of metals.

Positive sols

This invention utilizes sols of positively charged colloidal particles of an inorganic substance. Such sols are referred to herein as positive sols. The preferred positive sols for use in this invention are those in which the positively charged colloidal particles are composed of a silica core coated with a polyvalent metal-oxygen compound. Sols of this type are described in U.S. Pat. 3,007,878. As indicated in this patent, the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium, and thallium or tetravalent titanium, germanium, zirconium, tin, cerium, hafnium and thorium. For purposes of economics it is preferred that the positive sol be an aqueous dispersion of alumina-coated colloidal silica particles of the type illustrated in FIG. 1 of U.S. 3,007,878.

An example of a charged alumina-coated silica sol which is particularly useful in this invention is one in which there is one mole of aluminum per mole of surface silica and which is prepared by a process described in Example 2 of co-pending commonly assigned application Ser. No. 831,748, now abandoned, as follows:

264 lbs. of "Ludox" HS colloidal silica containing 40% $SiO_2$ by weight, the silica particles having an average particle size of 12–15 millimicrons and a specific surface area of about 215 m.$^2$/g. $SiO_2$, is adjusted to pH 7.50 with 821 grams of a 1:1 mixture of a concentrated hydrochloric acid in water. The sol is mixed with 62.8 lbs. of 50% chlorohydrol ($Al_2(OH)_5Cl$) and 61.7 lbs. of water by introducing it at a rate of 25 lbs./minute into a centrifugal pump circulating the basic aluminum chloride solution. The clear fluid intermediate product is heated to 60° C. in one-half hour and at 60° C. for two hours, cooled to 20° C., and stirred with a Lightnin® mixer as well as circulated with the pump as 600 grams magnesium hydroxide dispersed in 1800 grams water is introduced in 5 minutes to bring the pH to 5.65. Agitation and circulation are continued for 2 hours. The clear stable product contains 26.4% $SiO_2$, 4.2% $Al_2O_3$, 1.0% Cl and 0.23% MgO. The mole ratio of aluminum to surface $SiO_2$ is 1:1. The pH of the product after several weeks aging is 4.60, the viscosity is 15 cps., and the specific gravity at 25° C. is 1.23. This product (referred to hereinafter as Positive Sol 130M), is the positive sol which is used in the examples (except Examples XI and XXVI), set forth hereinbelow.

The medium for the positive sol need not be water. Low molecular weight alcohols or other polar organic liquids can be present in part or can entirely replace water.

Positive Sol 130M is stabilized by chloride ion. As described in U.S. 3,007,878 other anions, such as formate, acetate, lactate, nitrate, bromide, perchlorate, bromate, and trichloroacetate, can be used instead of chloride.

Other positive sols can be used in this invention in place of the sol composed of colloidal silica particles coated with polyvalent metal-oxygen compounds. In particular sols from a number of commercially available dispersible colloidal aluminas such as "Dispal" (Continental Oil Co.), "Alon G" (Cabot Corp.), and "Super-Ox" (Merkal Research Co.), can be used.

Polyfunctional organic and inorganic acids and salts

The reagents used to set the positive sol coatings in this invention are polyfunctional acids and their salts, i.e. compounds which contain two or more acid functional groups. As indicated above, it is believed that the setting effect of these polyanionic materials is due to the interaction of the anionic portions of the molecules with the positively charged colloidal particles, and a resultant cross-linking of colloidal particles due to the presence of two or more anionic portions in a single molecule.

The polyfunctional acid and salt setting agents can be organic or inorganic. The organic agents can be monomeric or polymeric. It is preferred that the organic agents contain a maximum of about 24 carbons per acid functional group, not including the carbons in any carboxylic acid functional groups.

Representative of the organic acid functional groups which are useful in these setting agents are:

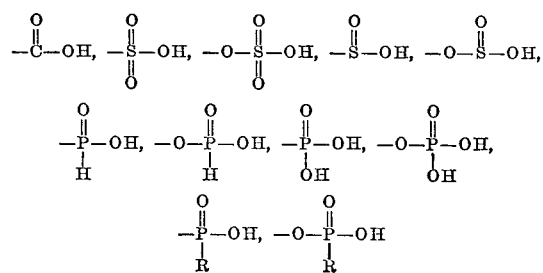

where R=$CH_3$—, $CH_3CH_2$—.

More than one type of acid group can be present in a single compound. For example, a compound useful as a setting agent in this invention can have both

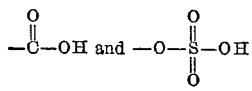

groups present.

The preferred acid group for compounds useful as chemical setting agents in this invention is the carboxylic acid group. The most preferred agents are di-carboxylic acids containing 0 to 10 carbon per carboxyl groups, and their salts.

Salts of the organic polyfunctional acids are also useful. Examples of cations in salts which can be used are lithium, sodium, potassium, ammonium, calcium, magnesium, methylammonium, trimethylammonium, triethanolammonium and the like. In general, choice is a matter of preference or availability of starting materials.

The organic moiety to which a plurality of acid groups is attached can be straight or branched-chain aliphatic, alicyclic, aromatic, or heterocyclic (where the hetero atom is O, N, or S), or combination of these, such as aliphatic-substituted aromatics, alicyclics, and heterocyclics. A hetero atom such as O, N, or S can substitute for a C atom in the aliphatics and mixed aliphatics, and the aliphatics, alicyclics, and heterocyclics can contain carbon-carbon unsaturation.

Examples of polyvalent organic anions which function as setting agents for coating compositions in this invention are:

oxalate, maleate, fumarate, succinate, glutarate, citrate, tartrate, 2-hydroxy-1,2,3-propanetricarboxylate, ethylenediaminetetraacetate, 1,2,3,4 - cyclopentanetetracarboxylate, thiodipropionate, trimellitate, o-phthalate, benzene hexacarboxylate,

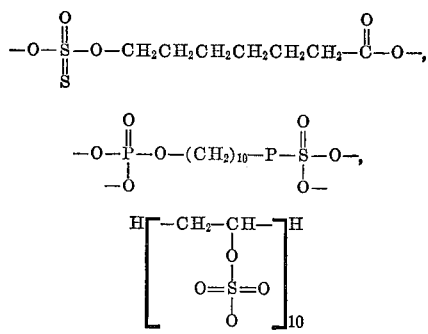

As indicated above, the organic moiety to which the plurality of acid functional groups are attached can be polymeric.

Means by which these reactive functional groups can be introduced into polymer structures are well known to the art. For instance, an unsaturated hydrocarbon containing one of the above groups can be homopolymerized or copolymerized with other suitable monomers; thus, methacrylic acid

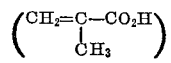

can be polymerized alone or with ethylene.

Representative of suitable comonomers for this invention are:

vinyl acetate
methyl vinyl ether
methyl methacrylate and ethyl acrylate
acrylonitrile and methacrylonitrile
styrene and α-methyl styrene
ethylene, propylene, butylene
vinyl chloride, vinylidene chloride
isoprene, chloroprene, butadiene
methyl vinyl ketone
dimethyl fumarate and maleate
acrylamide and methacrylamide It is of course possible to polymerize (or copolymerize with other monomers) salts of the unsaturated acid compounds. Examples of cations of useful salts are lithium, sodium, potassium, ammonium, calcium, methylammonium, triethanolammonium, and the like.

It is also possible to polymerize (or copolymerize with other monomers) esters or amides of the desired unsaturated acid compounds and later hydrolyze the ester or amide groups to acid groups.

Classes of polymers which are particularly effective in practicing this invention are the homopolymers and copolymers of acrylic acid and methacrylic acid. Such products are described in "Protective and Decorative Coatings," vol. 5, pages 47–49, J. J. Matticello, 2nd Edition, published by John Wiley and Sons, Inc., New York, N.Y.

Another means by which reactive groups can be introduced into polymer structures is through reaction of pre-formed polymers with appropriate chemical compounds. For example, a polyvinyl alcohol can be reacted with chlorosulfonic acid to give a sulfate acid polymer or with phosphoric anhydride to give a phosphate acid polymer.

Other useful polymers containing negative groups are the various modified cellulosic compounds, such as carboxymethylcellulose and its salts, hydrolyzed proteinaceous materials, gums, rosins, etc. and their salts.

Water is the preferred medium for the solutions of polyfunctional setting agents used in this invention. However, polar organic liquids such as the low molecular weight alcohols (e.g. methanol, isopropanol), ketones (e.g. acetone, methyl ethyl ketone), and dimethylformamide can be used. Mixtures of water and polar organic liquids are sometimes useful to improve solubility of the agents.

Some of the agents, especially the polymeric acids are not necessarily capable of forming true solutions in a solvent such as water, but are present as dispersions or suspensions of particles of colloidal dimensions, commonly referred to as latices. Frequently, all or part of the acidic groups in a polymer are in the form of salts, either to enhance the dispersibility or solubility of the polymer in water and/or polar organic liquids.

Concentrations of polyfunctional organic acid or salt setting agents in the liquid medium (expressed as weight percent) can be as low as 1% and as high as 50%, or even higher. The preferred concentrations are 5 to 40%, most preferred 10 to 30%.

Examples of inorganic polyvalent anions suitable for use in this invention include phosphate, phosphite, polyphosphate, sulfate, sulfite, borate, polyborate, silicate, chromate, molybdate, carbonate, vanadate, aluminate, arsenate, ferrocyanide, ferricyanide, thiosulfate, dithionate. Primarily, these reagent ions are employed as as the salts, though the acids are not excluded providing they are stable enough to handle. Preferred anions for this use are phosphate, polyphosphate, sulfate, thiosulfate and silicate. Cations in salts can be lithium, sodium, potassium, ammonium, calcium, magnesium, methylammonium and the like. Salts can be the "acid" salts as well as the full salts; for example, sodium hydrogen phosphate and sodium dihydrogen phosphate can be used in addition to sodium phosphate. Polyphosphate compounds can be any of the commercial or specially prepared products, generally mixtures of phosphates. "Calgon" is a commercial inorganic polyphosphate mixture containing predominantly sodium hexametaphosphate.

Water is the preferred medium for the inorganic polyvalent anionic reagents, though low molecular weight alcohols such as methanol and isopropanol, acetone, dimethylformamide and other polar organic liquids can be used, alone or mixed with water.

Concentrations of polyvalent inorganic compounds useful in carrying out the process of this invention can be as low as 1% and as high as 50%, or even higher. The preferred concentration of reagent compound is 5 to 30%.

An alternative method of contacting the positive sol-coated pattern with setting agent, is to incorporate the setting agent into the stucco refractory grain. For this purpose the polyfunctional acid or salt can be mixed with or coated on the refractory grain.

Refractory grain

In building shell molds in accordance with this invention, any finely divided refractory material may be used provided that it does not react with the binders. Among suitable refractory materials are zircon, Molochite, fused silica, sillimanite, mullite and alumina. To obtain castings with a smooth surface finish, all the refractory grain in the primary or first coating composition should pass a 100-mesh sieve and preferably 85% should pass a 200-mesh sieve. Even finer mesh refractory may be employed for better surface finish and it is preferred in most instances. In subsequent coatings the refractory may be much coarser but it is preferred that all the material pass a 100-mesh sieve. These mesh sieve numbers correspond to the Standard U.S. Sieve Series.

The refractory material used for the stucco is preferably a coarser grade of the same refractory grain used in the slurry composition. For example, if refractory in a prime coat slurry is zircon with approximately 75% passing the 325-mesh sieve, the refractory used for the stucco can also be zircon in the range of −80 to 140 mesh. It is not essential, however, that refractory material of the same composition should be used for both the stucco and the slurry. Examples of refractory materials suitable for stucco are zircon, zirconia, sillimanite, mullite, fused silica, alumina and fire clay grog.

Slurries

In most instances, practice of this invention will involve the preparation and use of two slurries, both containing positive sol and refractory grain. One slurry will contain relatively fine refractory grain and will be used for the prime coat. The other will contain a coarser refractory grain and be used for the back-up or follow-up coats. Howevery it is possible to use the same slurry for both prime coat and follow-up coats. Also, it is possible to use positive sol without refractory grain. This may be particularly advantageous, especially for the prime coat where it is desired to obtain a very fine finish on the metal casting. Generally it will be desirable to use a less expensive refractory grain in the back-up coats than is used in the prime coat.

Molochite, an aluminiosilicate, is frequently used as the back-up coat for a zircon prime coat, and a slightly coarser grade of a fused silica powder is used as the back-up coat for a finer fused silica prime coat.

A discussion of the preparation of some specific slurries which are useful in the practice of this invention follows. In these slurries the positive sol is Positive Sol 130M, described hereinabove.

Zircon

The zircon slurries used in the zircon-Molochite slurry system employ a finely ground zircon flour (No. 3 grade from Casting Supply House). This flour is described as −325 mesh, since approximately 75% passes through this screen. This flour is mixed with positive sol to make a prime coat slurry. The resulting coatings are very smooth, dense and inert to molten metals and alloys, and possess good thermal stability to 2500° F. and above.

In making the positive sol-zircon slurry the flour is added to the positive sol and to any water, if needed, while mixing. A propeller-type agitator is suitable for this purpose. Slurry equilibrium is usually reached after a few hours of agitation, although high shear mixing of a new batch is not recommended because of overheating. The combination of low slurry viscosity and zircon's high density can cause the grain to settle out unless sufficient agitation is maintained. The best slurry working temperature is 75–85° F.

The zircon slurries will function over a wide range of viscosities. The viscosities obtained at 80° F. with a No. 4 Zahn viscosimeter are in a range of 5–12 seconds and more preferably in a range of 8–10 seconds.

Molochite

The Molochite employed in the zircon-Molochite slurry system is a coarser flour than the No. 3 zircon flour. This flour (No. 6 Molochite, from Casting Supply House) is defined as being −200 mesh since approximately 75% will pass through a 200 mesh screen. No. 6 Molochite is mixed with positive sol binder to make a slurry for the back-up or follow-up coats. The positive sol-Molochite slurry is made in the same manner as the zircon slurry described above. Only a few hours of mixing is required to attain slurry equilibrium. The best slurry working temperature is in the range of 75–85° F. At 80° F. the viscosity of the positive sol-Molochite slurry obtained with a No. 4 Zahn cup is in the range of 5–11 seconds and more preferably 7–8 seconds.

Fused silica

Two different particle sizes of "Nalcast" fused silica (Nalco Chemical Company) are used for dip slurries. These are "Nalcast" P1W fused silica flour and "Nalcast" P-2 fused silica flour.

"Nalcast" 1W flour has a wide particle size distribution and is used with positive sol to prepare a thick slurry for the inner or prime shell coat. "Nalcast" P1W is defined as −200 mesh since all the grains will pass through a 200 mesh sieve and approximately 75% will pass a 325 mesh sieve.

In making the positive sol-"Nalcast" P1W slurry the sol is added along with the calculated amount of water to the mixing container. Technical grade (70%) hydroxyacetic acid is added to the positive sol at approximately 2% by weight based on solids, in order to maintain the slurry viscosity. The apparent chemical function of the acid is to complex with ionic impurities, especially those arising from iron in the silica, which have a destabilizing effect upon positive sol. The "Nalcast" P1W flour is then added with good agitation to the sol. About 85% of the flour will stir in readily; the last portion is added in small increments. The use of efficient mixing equipment will permit the preparation of a suitable slurry in a few hours. The stirrer should be stopped for periods to allow the entrapped air bubbles to rise to the surface and break. Care should be taken that stirring is not carried out with excessive shear such that the slurry overheats from the friction generated. The best slurry working temperature is 75–85° F. The slurry will function over a wide range of viscosity, but a suitable viscosity measured with a No. 4 Zahn cup at 80° F. is in the range 25–35 seconds and more preferably 29–31 seconds.

"Nalcast" P–2 flour is a coarser powder than "Nalcast" P1W and is defined as —100 mesh since all will pass through a 100 mesh screen and approximately 45% will pass a 325 mesh screen. "Nalcast" P–2 flour is used with the positive sol binder to make a slurry for forming the back-up or outer shell coats.

The positive sol-"Nalcast" P–2 slurry is made in the same manner as the corresponding "Nalcast" P1W slurry. However, the "Nalcast" P–2 slurry is easier to mix because "Nalcast" P–2 flour is coarser than "Nalcast" P1W and the slurry is made less viscous. The slurry viscosity as determined on the No. 4 Zahn cup at 80° F. is suitably in the range 12–25 seconds; more preferably in the range 15–18 seconds.

The broad ranges of composition along with the more preferred ranges of compositions for prime and back-up coats in both the zircon-Molochite and "Nalcast" fused silica systems just discussed are given in Tables I and II.

TABLE I.—ZIRCON-MOLOCHITE SYSTEM

| | Composition, parts by weight | |
|---|---|---|
| | Broad range | Preferred range |
| Prime coat slurry: | | |
| Zircon refractory flour, 325 mesh | 86–50 | 86–67 |
| Aqueous positive sol | 14–50 | 14–33 |
| Extra water | (1) | None |
| pH | 4.3–4.8 | 4.3–4.8 |
| Viscosity, No. 4 Zahn Cup, sec | 5–12 | 6–11 |
| Colloidal particle to refractory flour ratio | 0.05–0.30 | 0.05–0.15 |
| Back-up slurry: | | |
| Molochite refractory flour, 200 mesh | 75–50 | 65–50 |
| Aqueous positive sol | 25–50 | 35–60 |
| Extra water | (1) | None |
| pH | 4.5–5.0 | 4.5–5.0 |
| Viscosity, No. 4 Zahn Cup, sec | 5–11 | 7–9 |
| Colloidal particle to refractory flour ratio | 0.10–0.335 | 0.16–0.30 |

1 As needed.

TABLE II.—"NALCAST" FUSED SILICA SYSTEM

| | Composition, parts by weight | |
|---|---|---|
| | Broad range | Preferred range |
| Prime coat slurry: | | |
| "Nalcast" P1W fused silica | 75–60 | 70.5–69 |
| Aqueous positive sol | 10–40 | 16.5–31 |
| Extra water | 14–0 | 13–0.0 |
| Hydroxyacetic acid (70%) | 1.0–3.0 | 0.5 |
| pH | 3.8–4.2 | 3.8–4.2 |
| Viscosity, No. 4 Zahn Cup, sec | 25–35 | 28–32 |
| Colloidal particle to refractory flour ratio | 0.04–0.20 | 0.05–0.10 |
| Back-up slurry: | | |
| "Nalcast" P–2 fused silica | 75–53.5 | 75–60 |
| Aqueous positive sol | 10–46.5 | 25–40 |
| Extra water | 14–0 | None |
| Hydroxyacetic acid (70%) | 1.0–3.0 | 0.5–0.4 |
| pH | 3.8–4.2 | 3.8–4.2 |
| Viscosity, No. 4 Zahn Cup, sec | 12–25 | 15–19 |
| Colloidal particle to refractory flour | 0.04–0.26 | 0.10–0.20 |

Adjustment of the slurries to a suitable working viscosity range is carried out by adding water or refractory flour as needed. In the more preferred ranges of colloidal particle to refractory flour ratios water or refractory flour additions are rarely needed in preparing the slurries, but for the lower ratios some additional water is generally required. Over the working life of the slurries frequent water additions are made to maintain proper consistency in order to compensate for water loss by evaporation.

The working viscosities are low initially and this enhances ready peneration of the slurries into recessed areas or blind cores of patterns, providing proper filling with slurry and preventing air entrapment, sometimes obtained with high viscosity slurries.

The pH of the slurries as indicated in the tables is measured with a Beckman Zeromatic pH meter using a Beckman 39301 glass electrode and a Beckman 39402 calomel reference electrode. The reported pH values are those of the slurries as mixed. These values are not critical and no significant pH change is observed in the working life of the slurries up to several weeks.

In the "Nalcast" fused silica slurries, both the prime coat and back-up coat viscosities are higher than those employed in the zircon-Molochite system. However, these fused silica slurry viscosities are less than those normally used in the "Nalcast"-aqueous colloidal silica system. The lower viscosities aid in wetting out and uniformly building up recessed areas and blind cores on wax patterns.

Pattern materials and cleaning

Conventional wax and plastic expendable patterns of the object to be reproduced in metal are prepared. These patterns are then affixed to a sprue and runner system, giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent-cleaned assembly is dried and as such is ready for dipping in the prime coat slurry.

Although wax and plastics are the preferred expendable pattern materials others such as low-melting tin-bismuth alloys may also be employed.

Dipping

In the shell building process a solvent-cleaned expendable pattern assembly such as wax is first dipped into a bath comprising a positive sol which preferably contains refractory grain. The pattern assembly is thoroughly wetted in the prime coat slurry, withdrawn, drained and rotated to insure complete coverage in recessed areas or in blind cores. The coated pattern is then stuccoed, usually with a somewhat coarser grain of the same refractory used in the slurry. Stuccoing is accomplished in the conventional manner by dipping the coated pattern into a fluidized bed of the stucco grain or by sprinkling the stucco grain onto the surface of the coated pattern.

After stuccoing, the stuccoed coatings are chemically set or immobilized by dipping the pattern into a solution or dispersion of the setting agent. Generally a soak time of 5–15 seconds is allowed to insure thorough wetting and peneration of the setting agent. Thorough draining of the setting agent solution from the pattern is necessary to avoid contamination of the slurry during the following coating step; usually about 5 minutes is allowed. An acceptable alternative which speeds things up is to rinse the coated pattern in water to remove excess agent. Also, in place of dipping, a coated pattern can be sprayed with a solution of the setting agent.

After the prime coat is applied the coated pattern is dipped into the back-up coat slurry, stuccoed, dipped into the setting agent solution, and drained or rinsed. These steps are repeated until a coating of the desired thickness is obtained. Usually about 8 to 10 coats, including prime coat and back-up coats, are used. However, as little as a total of 4 coats or even less can be employed, or as much as 30 coats or more, depending upon wax pattern assembly, pattern size, and configuration. The large number of coats can find application in making shells for massive castings not usually made by the precision investment casting technique.

Drying

After the final coat is applied the shell assembly is ready for drying. Drying under ambient conditions for 18 to 24 hours is sufficient to drive off the bulk of the water enabling the assembly to be dewaxed without blistering or exhibiting cracks. Forced air drying at 110° F. for 5 hours is also sufficient to evaporate a comparable quantity of water and permit dewaxing of the shell without blistering or exhibiting cracks.

Dewaxing

Dewaxing of the shells may be carried out by the normal procedures available; i.e., flash furnace dewaxing at 1700–1900° F., steam autoclave dewaxing and solvent vapor dissolving of the wax.

Flash dewaxing is carried out by placing the shell assembly in a furnace previously heated at 1700–1900° F. At these temperatures the wax is heated and expands, exerting an internal pressure on the shell structure. This pressure is relieved by the wax melting and running out the pouring cup in the shell assembly and also to a lesser extent permeating into the pores of the structures. Shell assemblies dried under controlled humidity and temperature conditions as well as forced air dried at 100° F. for 5 hours as cited previously, do not exhibit cracks or blisters and are suitable for metal casting.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promite rapid heating of the wax. Shell assemblies dewaxed in a steam autoclave exhibit crack free and blister free surfaces suitable for metal casting.

Solvent vapor elimination of the wax in shell assemblies is carried out with trichloroethylene vapor. The solvent is boiled in a lower portion of a degreasing tank and the vapors penetrate the pores of the ceramic shell assembly and immediately dissolve the wax faces adjacent to the ceramic investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

Examples

The following examples further illustrate the process and products of this invention. In the examples percentages and parts are by weight unless otherwise specified.

Example I

A shell mold suitable for precision casting of metals is prepared according to the method of this invention in the following manner.

A prime coat slurry is prepared by mixing 325 mesh zircon grain (No. 3 flour, Casting Supply House) with Positive Sol 130M, an aqueous dispersion of aluminum-coated colloidal silica, and stirring the mixture for 24 hours before use. The composition having a binder solids-to-zircon ratio of 0.09, is:

Prime coat slurry A: Parts by weight
Zircon flour, 325 mesh _____ 77.0
Positive Sol 130 M (30% $SiO_2$—$Al_2O_3$) _____ 23.0

In the same manner a back-up coat slurry is prepared by mixing 200 mesh Molochite grain (No. 6 flour, Casting Supply House) with Positive Sol 130M and stirring for 24 hours before use. The composition having a binder solids-to-Molochite ratio 0.16, is:

Back-up coat slurry B: Parts by weight
Molochite flour, 200 mesh _____ 64.5
Positive Sol 130M (30% $SiO_2$—$Al_2O_3$) _____ 35.5

A wax pattern is thoroughly cleaned in methyl ethyl ketone. The pattern is then dipped into prime coat Slurry A until wetted, withdrawn and drained of excess slurry and, while still wet, inserted into a fluidized bed containing zircon stucco grain (No. 1 zircon, —80 to +140 mesh, Casting Supply House).

Immediately, without drying, the pattern is dipped into a 15% aqueous solution sodium succinate, soaked for 15 sec., then soaked in water for 30 sec. with gentle swirling to remove excess setting agent.

Similarly, the pattern is given a back-up coat of Slurry B and stuccoed with Molochite grain (—30 to +60 mesh, Casting Supply House) in a fluidized bed. Again, the coating is chemically set with the sodium succinate reagent as described.

This sequence is repeated 6 times with back-up coat Slurry B to give a mold approximately ⅜" thick within about 20 minutes. At no point is sloughing of a coating seen. The stabilities of the two slurries used in this procedure are found to be unimpaired.

After air drying under ambient conditions for 24 hours the wax is removed from the mold by heating the coated pattern in a melt-out furnace at 1700 to 1800° F. for 2 to 3 minutes. The shell is heated an additional 15 to 20 minutes to insure complete removal of carbon.

The mold is free of cracks and other defects and is suitable for metal casting.

Subsequently, AMS 5382 high temperature alloy (25% Cr, 10% Ni, 8% W, and the remainder Co, nominal analysis) is poured into the mold to give a sound casting.

Examples II–V

Example I is repeated substituting the listed setting agents in the amounts shown for the sodium succinate of Example I.

| Example | Anionic setting agent | Percent in water |
|---|---|---|
| II | Ammonium oxalate | 10 |
| III | Potassium glutarate | 30 |
| IV | Sodium citrate | 15 |
| V | Potassium ophthalate | 20 |

Good molds similar to that obtained in Example I are obtained in each of Example II to V.

Example VI

Example I is repeated substituting trimellitic acid as a 20% solution in 50/50 isopropanol-water for sodium succinate of Example I. A good mold similar to that obtained in Example I is produced.

Example VII

Example I is repeated substituting methylammonium maleate as a 15% solution in 75/25 methanol-water for sodium succinate of Example I. A good mold similar to that obtained in Example I is produced.

Example VIII

Example I is repeated substituting 1,2,3,4-cyclopentane-tetracarboxylic acid as a 15% acid solution in water for sodium succinate of Example I. A good mold similar to that obtained in Example I is produced.

Example IX

A shell mold is prepared according to the method of this invention in a manner similar to that employed in Example I.

The zircon prime coat slurry made with Positive Sol 130M, designated A in Example I, is used in constructing the mold.

In the manner of Example I a back-up coat slurry is prepared. The proportion of ingredients is formulated to give a binder solids-to-refractory grain ratio of 0.30. This is designated back-up coat Slurry C:

Back-up coat slurry C: Parts by weight
    Molochite flour, 200 mesh _____ 50.0
    Positive Sol 130M (30% $SiO_2$—$Al_2O_3$) _____ 50.0

A shell mold is built up on a wax pattern as described in Example I using a 20% aqueous solution of

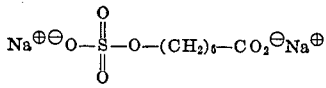

to set prime and back-up coatings. Complete fabrication of these shells requires only 15 min. The air dried and fired mold is free of cracks and other defects and suitable for casting of metals.

Example X

A shell mold is prepared according to the method of this invention in a manner similar to that described in Example I.

One slurry is used in this example. It is designated Slurry D and is prepared by mixing "Nalcast" P1W fused silica flour (Nalco Chemical Co.) with Positive Sol 130M containing hydroxyacetic acid and stirring for 48 hours before use. The hydroxyacetic acid is required for stabilization purposes and is added with additional water to the Positive Sol 130M prior to the silica flour. Binder solids-to-refractory grain weight ratio is 0.10.

Slurry D: Parts by weight
    "Nalcast" P1W fused silica _____ 70.1
    Positive Sol 130M (30% $SiO_2$—$Al_2O_3$) _____ 23.4
    Water _____ 6.0
    Hydroxyacetic acid (70% tech.) _____ 0.5

A shell mold is formed on a clean wax pattern in the manner described in Example I except in this case one slurry serves for both prime and back-up coats:

Initially a prime coat of Slurry D is applied and stuccoed with "Nalcast" S-1 fused silica (Nalco Chemical Co.). The coated pattern then is dipped into a 25% solution

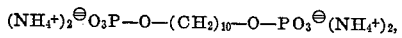

held for 15 seconds, allowed to drain well for several minutes.

Six back-up coats of Slurry D stuccoed with "Nalcast" S-2 fused silica then is applied and chemically set in the same way.

Complete fabrication of the shell mold requires 30 minutes. The air dried and fired mold is free of cracks and other defects and is satisfactory for casting of metals.

Example XI

A shell mold of excellent quality is prepared according to the procedure set forth in Example I, using the composition given therein, with the exception that:

Positive Sol 130M is replaced in the prime coat and back-up coat slurries with another acidic aqueous dispersion of positively charged colloidal particles which have acetate rather than chloride counter-ions and is referred to as an acetate positive sol. The percent silica-alumina solids in this sol is also 30%.

Examples XII–XIX

Example I is repeated substituting the listed setting agents in the amounts shown for sodium succinate of Example I.

| Example | Anionic setting Agent | Percent in water |
|---|---|---|
| XII | Sodium dihydrogen phosphate | 15 |
| XIII | Sodium bisulfate | 10 |
| XIV | Potassium thiosulfate | 20 |
| XV | Ammonium pentaborate | 5 |
| XVI | Methylammonium polyphosphate | 25 |
| XVII | "F" Grade Sodium silicate (Du Pont Co.) 3.2:1 molar ratio $SiO_2$:$Na_2O$. | 1 20 |
| XVIII | Lithium Polysilicate 48 (Du Pont Co.) | 1 15 |
| XIX | Potassium Silicate No. 30 (Du Pont Co.) | 1 21 |

1 $SiO_2$.

Example XX

Example I is repeated, substituting a 30% aqueous dispersion of Acrysol AGE-60, a methyl acrylate/acrylic acid copolymer (Rohm & Haas Co.), for the 15% aqueous solution of sodium succinate. A good mold similar to that obtained in Example I is obtained.

Example XXI

Example XX is repeated substituting Acrysol A-1 (Rohm & Haas Co.), a 25% solution of polyacrylic acid, which has been adjusted to pH 5.0 with ammonium hydroxide for the polymer dispersion of Example XX. A good mold similar to that obtained in Example XX is produced.

Example XXII

Example XX is repeated substituting a 15% solids latex of a 75/25 vinyl acetate/potassium 4-vinyl benzene sulfonate copolymer for the polymer dispersion of Example XX. A good mold similar to that obtained in Example XX is produced.

Example XXIII

Example XX is repeated substituting a 10% solution of Gantrez AN-119, a methyl vinyl ether/maleic anhydride copolymer (General Aniline & Film Co.), which has been adjusted to pH 4.0 with sodium hydroxide for the polymer dispersion of Example XX. A good mold similar to that obtained in Example XX is produced.

Example XXIV

Example X is repeated, except that the setting agent is a 15% aqueous solution of a phosphate acid polymer prepared by reacting a poly (vinyl alcohol) and phosphorous pentoxide and dissolving the product in water. A mold of comparable quality to that produced in Example X is obtained.

Example XXV

A shell mold is prepared as in Example XX, except that the acetate stabilized sol of Example XI is substituted for the positive Sol 130M. A shell mold of excellent quality is obtained by this procedure.

Although the invention has been described with particular reference to its preferred use in making expendable refractory shell molds for precision investment casting of metals, it obviously can be adapted to many other useful purposes. In general it can be used in any case where it is desired to provide a high temperature resistant, heat insulating layer on the surfaces of an object such as an automobile muffler or manifold. For this purpose the positive sol slurries can include various refractory insulating material such as expanded perlite. Also the process can be used to provide high temperature resistant coatings which are heat conductive by including a particulate refractory metal in the slurries. Since the slurries can be low viscosity the process can be adapted to the manufacture of a variety of intricate refractory shapes on either disposable or permanent cores.

Certain of the inorganic polyanionic setting agents described above, viz. the aluminates, phosphates, polyphosphates, and silicates, are useful binders as well as setting agents. Therefore, it is possible and often desirable to include particulate refractory material in the solutions or dispersions of these setting agents. For example a slurry containing 2 parts by weight Molochite flour (200 mesh)

to 1 part by weight "F" grade sodium silicate solution (Du Pont Co., 15% SiO$_2$, SiO$_2$/Na$_2$O ratio=3.25) can be used alternately with positive sol slurries, such as Slurries A and B of Example I, to build up shell molds by the method of this invention. Other silicates which can be used in a similar manner include potassium and lithium silicates, quaternary ammonium silicates, amine silicates and guanidine silicate. Aluminates, phosphates, and polyphosphates of lithium, potassium, sodium, and ammonium can be similarly used.

It is frequently desirable to include in the positive sol dip bath a fibrous reinforcing agent to improve the green and fired strengths of the resulting refractory laminates. Examples of fibers which can be used are Kaowool® volcanic rock fibers, Fiberfrax® aluminosilicate fibers, and glass fibers.

I claim:

1. A rapid process for forming a refractory laminate on the surface of a support structure which comprises:
   (a) dipping the structure in a bath comprising a sol of positively charged colloidal silica particles coated with a polyvalent metal-oxygen compound to form a coating on the surface of the structure,
   (b) contacting the coated surface with a solution or dispersion of a polyfunctional organic or inorganic acid or salt setting agent to firmly set the coating,
   (c) removing excess setting agent from the surface, and
   (d) repeating steps (a) through (c) in sequence as required to build a refractory laminate of the desired thickness.

2. Process of claim 1 wherein the bath of step (a) is a slurry of particulate refractory material in a sol of positively charged colloidal particles composed of a silica core coated with a polyvalent metal-oxygen compound.

3. Process of claim 2 wherein the polyvalent metal-oxygen compound is alumna.

4. Process of claim 3 wherein in step (b) the surface is dipped into a solution of the setting agent.

5. A rapid process for forming expendable refractory shell molds for precision investment casting of metals comprising:
   (a) dipping a disposable pattern of the metal casting in a bath comprising a sol of positively charged colloidal silica particles coated with a polyvalent metal-oxygen compound to form a coating on the pattern,
   (b) contacting the coated pattern with a solution or dispersion of a polyfunctional organic or inorganic acid or salt setting agent to firmly set the coating,
   (c) removing excess setting agent from the coated pattern, and
   (d) repeating steps (a) through (c) in sequence as required to build a refractory shell mold of the desired thickness.

6. Process of claim 5 wherein the bath of step (a) is a slurry of refractory grain in a sol of positively charged colloidal particles composed of a silica core coated with a polyvalent metal-oxygen compound.

7. Process of claim 6 wherein the coated pattern is stuccoed between steps (a) and (b).

8. Process of claim 7 wherein in step (b) the stuccoed pattern is dipped into a solution of the setting agent.

9. Process of claim 8 wherein two slurries of refractory grain in a sol of positively charged colloidal particles are used, the first slurry containing relatively fine refractory grain and being used for the prime coat, and the second slurry containing relatively coarse refractory grain and being used for subsequent coats.

10. Process of claim 8 wherein the setting agent is a polyfunctional organic acid or salt containing up to about 24 carbon atoms per acid functional group, the acid functional groups being selected from the group:

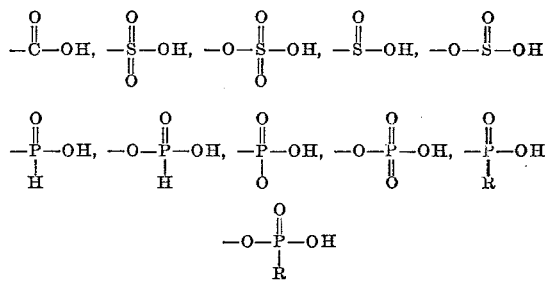

where R=CH$_3$, CH$_3$CH$_2$—

11. Process of claim 8 wherein the setting agent is a member of the group consisting of stable acids, acid salts, and full salts of the following anions: phosphate, phosphite, polyphosphate, sulfate, sulfite, borate, polyborate, aluminate, silicate, chromate, molybdate, carbonate, vanadate, arsenate, ferrocyanide, ferricyanide, thiosulfate, dithionate.

12. Process of claim 6 wherein, in step (b), the coated pattern is dipped into a slurry of refractory grain in a solution of a binder/setting agent selected from the group consisting of salts of the following anions: aluminates, silicates, phosphates, and polyphosphates.

References Cited

UNITED STATES PATENTS

| | | | |
|---|---|---|---|
| 3,292,220 | 12/1966 | Emblem | 106—38.35 |
| 3,232,771 | 2/1966 | Pearce | 106—38.35 |
| 3,007,878 | 11/1961 | Alexander et al. | 106—286 |
| 2,856,302 | 10/1958 | Reuter | 106—38.3 |
| 3,428,465 | 2/1969 | McLeod | 106—38.35 |
| 3,309,212 | 3/1967 | Lubalin | 106—38.3 |
| 3,165,799 | 1/1965 | Watts | 106—38.35 |
| 3,226,784 | 1/1966 | Owen et al. | 106—38.35 |
| 3,399,067 | 8/1968 | Scott | 106—38.35 |
| 3,396,775 | 8/1968 | Scott | 164—26 |
| 3,270,382 | 9/1966 | Emblem | 106—38.35 |

DANIEL J. FRITSCH, Primary Examiner

U.S. Cl. X.R.

106—38.35; 117—29, 62, 70 D; 164—26